United States Patent
Simms

(10) Patent No.: US 7,373,507 B2
(45) Date of Patent: May 13, 2008

(54) SYSTEM AND METHOD FOR ESTABLISHING SECURE COMMUNICATION

(75) Inventor: Timothy J. Simms, Columbia, MD (US)

(73) Assignee: Plethora Technology, Inc., Kearneysville, WV (US)

(*) Notice: Subject to any disclaimer, the term of this patent is extended or adjusted under 35 U.S.C. 154(b) by 509 days.

(21) Appl. No.: 09/986,319

(22) Filed: Nov. 8, 2001

(65) Prior Publication Data

US 2002/0056040 A1   May 9, 2002

(51) Int. Cl.
*H04L 9/00* (2006.01)
*H04K 1/00* (2006.01)

(52) U.S. Cl. ............ 713/168; 713/150; 713/171; 380/255; 380/283; 380/285

(58) Field of Classification Search ............ 713/171, 713/183, 169, 150; 380/283, 285
See application file for complete search history.

(56) References Cited

U.S. PATENT DOCUMENTS

| | | | |
|---|---|---|---|
| 4,200,770 A | | 4/1980 | Hellman et al. |
| 4,649,233 A | * | 3/1987 | Bass et al. .................. 713/171 |
| 5,172,414 A | | 12/1992 | Reeds, III et al. |
| 5,241,599 A | * | 8/1993 | Bellovin et al. ............ 713/171 |
| 5,418,854 A | | 5/1995 | Kaufman et al. |
| 5,434,918 A | * | 7/1995 | Kung et al. .................. 713/169 |
| 5,440,635 A | | 8/1995 | Bellovin et al. |
| 5,497,421 A | | 3/1996 | Kaufman et al. |
| 5,535,276 A | | 7/1996 | Ganesan |
| 5,539,826 A | | 7/1996 | Dwork et al. |
| 5,604,803 A | * | 2/1997 | Aziz ........................... 713/155 |
| 5,701,434 A | | 12/1997 | Nakagawa |
| 5,732,137 A | | 3/1998 | Aziz |
| 5,748,736 A | | 5/1998 | Mittra |

(Continued)

FOREIGN PATENT DOCUMENTS

EP   0 292 790 A3   11/1988

(Continued)

OTHER PUBLICATIONS

Schneier B. Applied Cryptography John Wiley & Sons, Inc. 1996, 3rd Edition. pp. 30-31.

(Continued)

*Primary Examiner*—Ayaz Sheikh
*Assistant Examiner*—Kaveh Abrishamkar
(74) *Attorney, Agent, or Firm*—Nixon & Vanderhye PC

(57) ABSTRACT

A system and method is described in which two parties communicate a first shared random number and a second shared random number, and each independently use a combining function with inputs including the two shared random numbers to obtain a shared secret key. Secure communication of the shared random numbers is performed by using a password and an asymmetric key pair. The password and the private key are not communicated, thereby preventing eavesdroppers from obtaining information sufficient to determine the shared secret key. Direct attacks on the parties are foiled by preventing the password from being stored, not storing the private key, and using two shared random numbers in case one is compromised by an attack on one of the two parties. A party cannot be effectively impersonated without knowledge of the password, and a called party cannot be impersonated without additionally controlling the network.

16 Claims, 7 Drawing Sheets

Plethora Patent Specification

U.S. PATENT DOCUMENTS

| | | | |
|---|---|---|---|
| 5,778,065 A | | 7/1998 | Hauser et al. |
| 5,790,548 A | | 8/1998 | Sistanizadeh et al. |
| 5,835,592 A | * | 11/1998 | Chang et al. ............... 380/285 |
| 5,870,474 A | | 2/1999 | Wasilewski et al. |
| 5,872,847 A | | 2/1999 | Boyle et al. |
| 5,915,021 A | | 6/1999 | Herlin et al. |
| 5,937,068 A | | 8/1999 | Audebert |
| 5,953,424 A | | 9/1999 | Vogelsang et al. |
| 5,978,478 A | | 11/1999 | Korematsu |
| 6,018,581 A | * | 1/2000 | Shona et al. ................. 380/46 |
| 6,032,260 A | | 2/2000 | Sasmazel et al. |
| 6,038,322 A | | 3/2000 | Harkins |
| 6,041,123 A | | 3/2000 | Colvin, Sr. |
| 6,044,468 A | | 3/2000 | Osmond |
| 6,047,072 A | * | 4/2000 | Field et al. ................. 380/283 |
| 6,058,476 A | | 5/2000 | Matsuzaki et al. |
| 6,064,736 A | * | 5/2000 | Davis et al. ................. 713/155 |
| 6,075,860 A | | 6/2000 | Ketcham |
| 6,075,861 A | | 6/2000 | Miller, II |
| 6,085,320 A | | 7/2000 | Kaliski, Jr. |
| 6,097,817 A | | 8/2000 | Bigic et al. |
| 6,101,182 A | | 8/2000 | Sistanizadeh et al. |
| 6,111,956 A | * | 8/2000 | Field et al. ................. 380/283 |
| 6,115,817 A | * | 9/2000 | Whitmire .................... 713/171 |
| 6,119,227 A | | 9/2000 | Mao |
| 6,134,661 A | | 10/2000 | Topp |
| 6,148,402 A | | 11/2000 | Campbell |
| 6,151,676 A | | 11/2000 | Cuccia et al. |
| 6,189,096 B1 | | 2/2001 | Haverty |
| 6,189,098 B1 | * | 2/2001 | Kaliski, Jr. .................. 713/168 |
| 6,487,660 B1 | * | 11/2002 | Vanstone et al. ........... 713/168 |
| 6,539,479 B1 | * | 3/2003 | Wu .............................. 713/151 |
| 6,718,467 B1 | * | 4/2004 | Trostle ........................ 713/171 |
| 6,886,095 B1 | * | 4/2005 | Hind et al. .................. 713/168 |

FOREIGN PATENT DOCUMENTS

| | | |
|---|---|---|
| EP | 0 292 790 B1 | 11/1988 |
| EP | 0 532 226 A2 | 3/1993 |
| EP | 0 532 226 A3 | 3/1993 |
| EP | 0 532 226 B1 | 3/1993 |
| EP | 0 661 845 A2 | 7/1995 |
| EP | 0 661 845 A3 | 7/1995 |
| EP | 0 686 905 A1 | 12/1995 |
| EP | 0 292 790 A2 | 11/1998 |
| EP | 0 824 732 B1 | 6/1999 |
| EP | 0 808 535 B1 | 12/1999 |
| EP | 1 041 823 A2 | 10/2000 |
| WO | WO 96/24997 | 8/1996 |
| WO | WO 96/34368 | 10/1996 |
| WO | WO 98/26538 | 6/1998 |
| WO | WO 99/34554 | 7/1999 |
| WO | WO 00/32475 | 6/2000 |
| WO | WO 00/72503 A1 | 11/2000 |
| WO | WO 01/11817 A2 | 2/2001 |
| WO | WO 01/11817 A3 | 2/2001 |
| WO | WO 01/13201 A2 | 2/2001 |
| WO | WO 01/13201 A3 | 2/2001 |

OTHER PUBLICATIONS

Palmegren, Keith, "Diffie-Hellman Key Exchange: A Non-mathematician's Explanation" http://securityportal.com/topnews/dhkeyexchange2000706.html, (printed on Aug. 2, 2001).

Connolly, P.J., "Peer to peer network security may depend soon on the strength of your 'reputation'" http://www.inforworld.com/articles/op/xml/1/03/19/010319opswatch.xml, (printed Aug. 2, 2001).

Gomes, Lee, WSJ Interactive Edition: "Is P2P plunging off the deep end?", http://www.zdnet.com/zdnn/stories/news/0,4586,2704598,00.html, (printed Aug. 2, 2001).

Bernhart, Andy, "*Share and Share Alike: Will P2P technology transform the B2B world?*", http://www.sdmagazine.com/articles/2001/0102/0102e/0102e.html, (printed on Aug. 2, 2001).

http://www.arabia.com/jordan/article/0,5127,Business%7C11232%7C18-03-2001,00.html, (printed on Aug. 2, 2001).

Gutbertlet, Lisa, "*Peer—to—Peer Computing—A Technology Fad or Fact*", http://www.ebs.ed/Lehrstuehle/Wirtschaftsinformatik/Lehre/Seminar00/p_gutberlet.pdf, (printed on Aug. 2, 2001).

"Chapter 9—Ensuring Messaging Security" http://www.microsoft.com/technet/treeview/default.asp?url=/TechNet/prodtechnol/exchange/prddocs/ex2kupgr/planus/p_09_ttl.asp, (printed on Aug. 2, 2001).

Kaufman et al. "Network Security: PRIVATE Communication In A Public World" Prentice Hall. Chapter 5 pp. 131-162 (1995).

Kaufman et al. "Network Security: PRIVATE Communication In A Public World" Prentice Hall. Chapter 9 pp. 223-264 (1995).

Kaufman et al. "Network Security: PRIVATE Communication In A Public World" Prentice Hall. Chapter 10 pp. 265-294 (1995).

Bace. "Technology Series: Intrusion Detection". MacMillan Technical Publishing. Chapter 6 pp. 135-154 (2000).

* cited by examiner

100

100

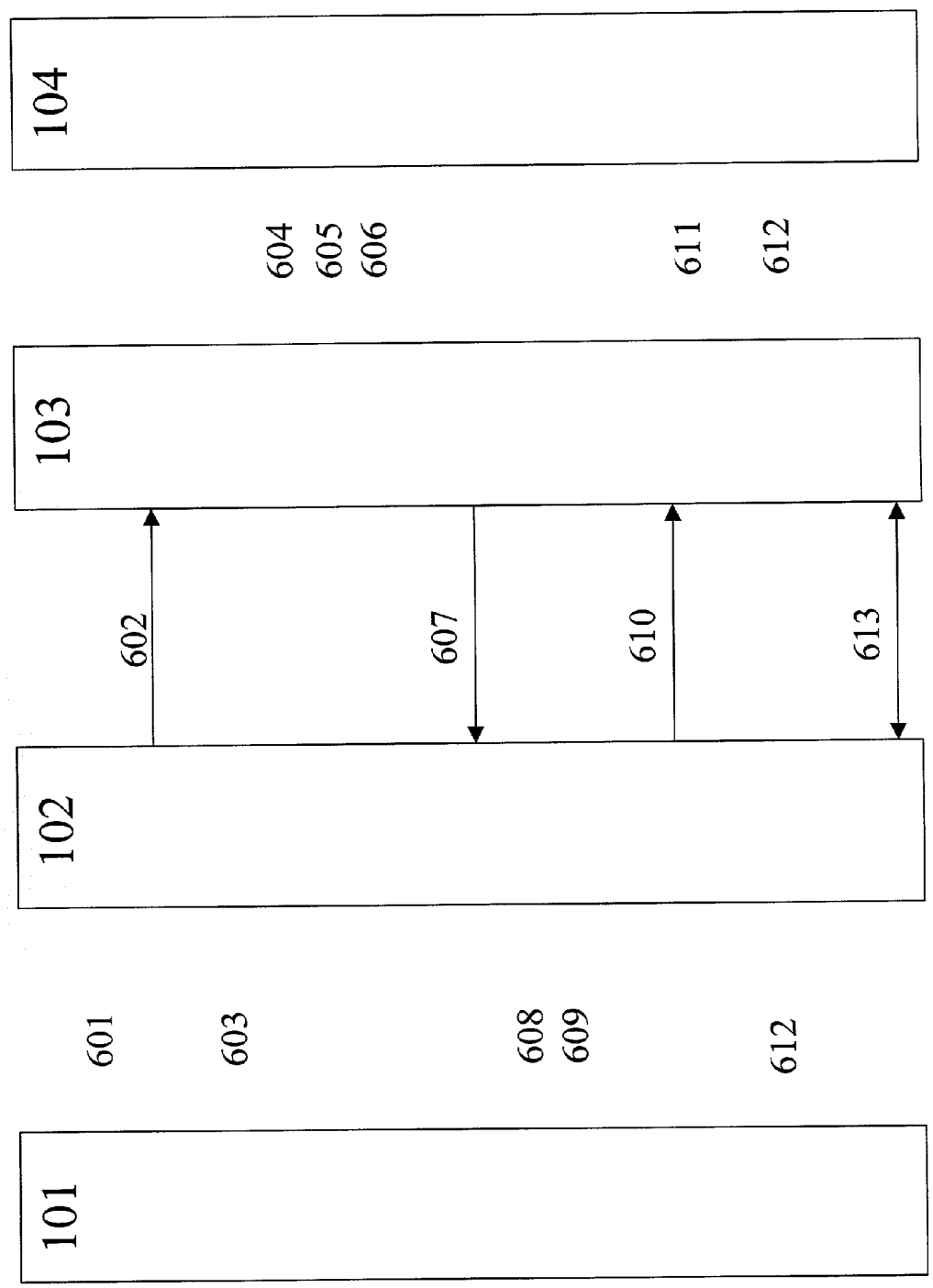

SYSTEM AND METHOD FOR ESTABLISHING SECURE COMMUNICATION

FIELD

The technology herein relates to encoding systems and protocols, and more specifically to systems and protocols for establishing a shared secret key for two-way secure communications.

BACKGROUND AND SUMMARY

When two parties wish to communicate securely, an efficient mechanism for doing so is the use of a shared secret session key, i.e., a key known only to the two parties that can be used symmetrically to both encrypt and decrypt messages between them for the duration of a communication session. Various methods exist to achieve this, and each have advantages and disadvantages.

Parties can use a trusted key authority that distributes the shared secret key to each of them separately using their unique key encryption key. However, this technique requires the storage of keys—i.e., it is not portable with a user, and if a key encryption key is compromised the system loses its integrity and past communications can be decrypted.

The "Diffie-Hellman" technique, described in U.S. Pat. No. 4,200,770, permits generation of a shared secret key without the use of encryption. Each party generates a large random number. By way of example, party A generates the number X and party B generates the number Y. Each party sends its number through a particular kind of one way function and transmits the output. Only knowledge of one number (X or Y), and the value of the other number sent through the one-way function is sufficient to generate the shared secret key. A drawback of the Diffie-Hellman technique is that each side uses a non-shared random number (X or Y) in independently generating the shared secret key. A result of the use of non-shared random numbers is that each side performs large exponential and modulo calculations when performing one-way functions and generating the shared secret key, resulting in a high computational load on both sides. These calculations are required in order to make it computationally infeasible for an eavesdropper to combine the two-shared numbers in order to obtain the shared secret key.

Variations on the Diffie-Hellman technique exist that attempt to make it more secure. These variations suffer from the same computational burden as the standard Diffie-Hellman technique. For example, U.S. Pat. No. 5,953,424 describes a system with a modification of the key generation technique. In addition to the usual Diffie-Hellman computations on the original numbers (X and Y) and the transmitted numbers (which result from calculations), the '424 patent describes extra factors that may be combined with the standard Diffie-Hellman factors. These factors are not transmitted, so they must be knowable in advance by the communicating parties.

Another variation of the Diffie-Hellman technique is disclosed in U.S. Pat. No. 5,440,635. In this variant, the transmitted numbers are further encrypted using a symmetric key cryptosystem before being transmitted. This doesn't ameliorate any of the disadvantages of Diffie-Hellman, noted above.

A message exchange technique employing a combination of public and private key cryptography to communicate a secret key from one party to another is described in U.S. Pat. No. 5,241,599. The '599 patent requires that each party share knowledge of a secret. A calling party generates a random public key/private key pair, and communicates the public key to the called party using their shared secret. The called party then communicates the secret key to the calling party using both the public key and the shared secret. The technique of the '599 patent suffers from several limitations. The calling party must generate a random public key/private key pair, which is a costly computation that is often preferably performed by the called party. Also, the secret key may be compromised in advance by manipulating the called party to affect the secret key it uses or computes. No manipulation or compromise of the calling party is required.

What is needed is a system and method for establishing secure communication.

The exemplary illustrative non-limiting technology herein provides an encoding protocol for communicating parties to each obtain a shared secret key.

One advantage of the exemplary illustrative non-limiting technology herein is that it is less computationally intensive than previous cryptographic systems to obtain a shared secret key.

Another advantage of the exemplary illustrative non-limiting technology herein is that the calling party is not required to perform any large computations.

Yet another advantage of the exemplary illustrative non-limiting technology herein is that it is highly resistant to attacks, including eavesdropping, impersonating a party, replay attacks, tampering with or probing a party before or after a communications session, and password database hijacking.

Still another advantage of the exemplary illustrative non-limiting technology herein is that it can be used either with or without certificates or physical tokens such as smart cards or biometric devices.

In an exemplary illustrative non-limiting method for obtaining a shared secret key, a party identifies a first shared random number and a second shared random number, and obtains the shared secret key from an output of a combining function having a first input including the first shared random number and having a second input including the second shared random number.

In a further aspect of the exemplary illustrative non-limiting implementation, the shared secret key is used to transform messages.

In another exemplary illustrative non-limiting implementation, a party encodes a first shared random number, decodes a second shared random number, and obtains the shared secret key from an output of a combining function having a first input including the first shared random number and having a second input including the second shared random number.

In a further exemplary illustrative non-limiting implementation, a party encodes a first shared random number and a second key using a first key obtained using information obtained from a password; decodes a second shared random number using a third key; and obtains the shared secret key from an output of a combining function having a first input including the first shared random number and having a second input including the second shared random number.

In a still further exemplary illustrative non-limiting implementation, the second key and the third key form an asymmetric key pair.

In another exemplary illustrative non-limiting implementation, a party decodes a first shared random number, encodes a second shared random number, and obtains the shared secret key from an output of a combining function having a first input including the first shared random number and having a second input including the second shared random number.

In a further exemplary illustrative non-limiting implementation, a party decodes a first shared random number and a second key using a first key obtained from information obtained from a password, encodes a second shared random number using the second key, and obtains the shared secret key from an output of a combining function having a first input including the first shared random number and having a second input including the second shared random number.

In another exemplary illustrative non-limiting implementation, a party communicates a first shared random number and a second shared random number, and obtains the shared secret key from an output of a combining function having a first input including the first shared random number and having a second input including the second shared random number.

In a further exemplary illustrative non-limiting implementation, the party communicates an asymmetric key and a timestamp with the first shared random number, and a timestamp with the second shared random number.

In still another exemplary illustrative non-limiting implementation, a device including at least one processor executes software instructions identifying a first shared random number and a second shared random number, and obtains the shared secret key from an output of a combining function having a first input including said first shared random number and having a second input including said second shared random number.

In yet another exemplary illustrative non-limiting implementation, a machine-readable storage medium contains instructions for a processor, including encoded computer means for identifying a first random number, encoded computer means for identifying a second random number, and encoded computer means for obtaining the shared secret key from an output of a combining function having a first input including said first shared random number and having a second input including said second shared random number.

BRIEF DESCRIPTION OF THE DRAWINGS

These and other features and advantages will be better and more completely understood by referring to the following detailed description of exemplary non-limiting illustrative implementations in conjunction with the drawings of which:

FIG. 6 illustrates a sequence of actions and communications among a user, a calling party, and a called party in one exemplary illustrative non-limiting embodiment.

DETAILED DESCRIPTION

Figure 1A:
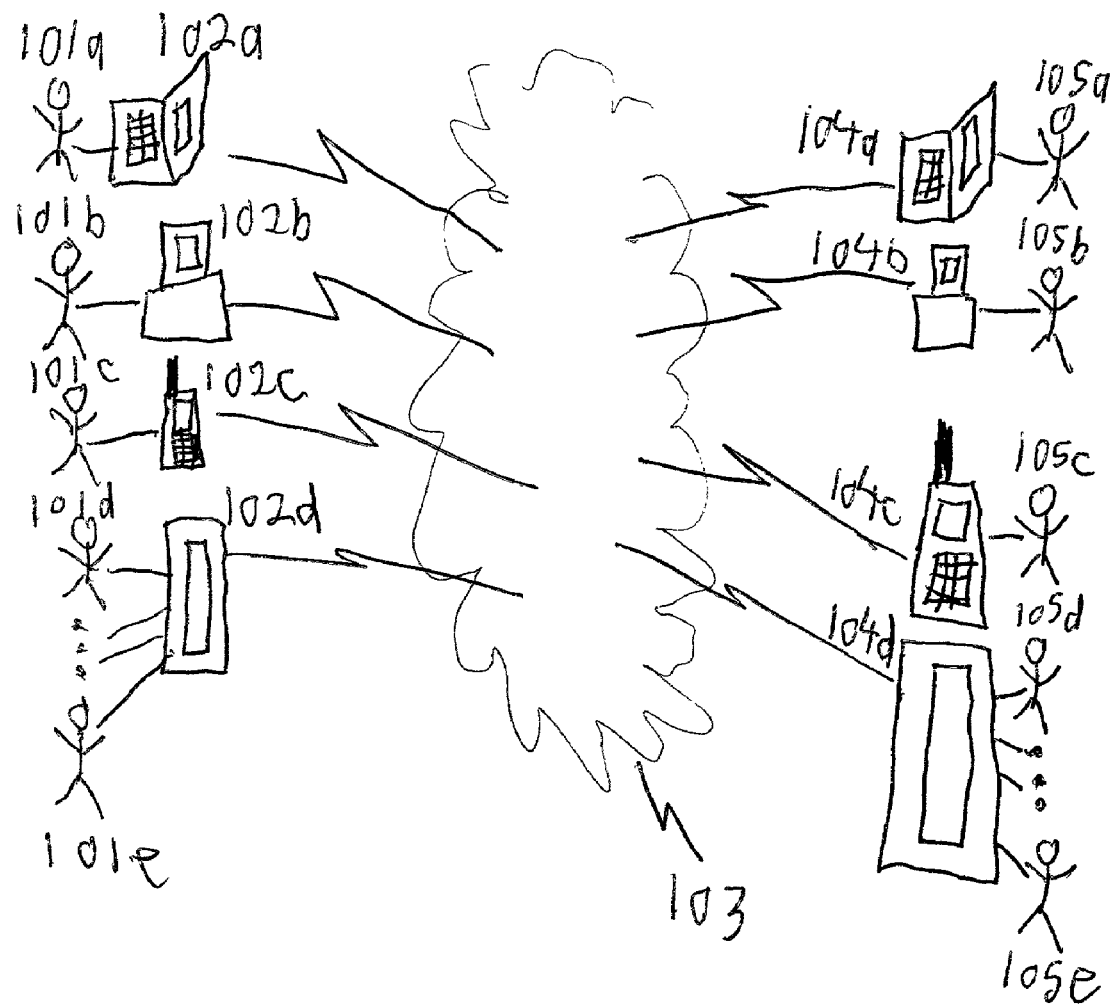
FIG. 1a illustrates an exemplary illustrative non-limiting peer-to-peer embodiment, including various exemplary non-limiting implementations of each peer.

The exemplary illustrative non-limiting technology herein provides a system and method for two parties to determine a shared secret key. Each party identifies a first shared random number and a second shared random number. Then, a combining function is used to obtain a shared secret key using the first shared random number and the second shared random number. Hence, knowledge of the combining function coupled with knowledge of the first shared random number and the second shared random number is sufficient to obtain the shared secret key. It is preferred, therefore, for the shared random numbers to be communicated between the parties without permitting would-be attackers to learn both shared random numbers. In some exemplary illustrative non-limiting embodiments, this is accomplished by using a password. Specifically, each party has access to either information obtained from a password, or of the password itself. In an exemplary illustrative non-limiting embodiment, the password is associated with a user.

A shared secret key may be used along with a symmetric encryption system such as IDEA (International Data Encryption Algorithm) in order to efficiently and securely perform communications between two parties. It is desirable that the shared secret key be secure and that the two parties authenticate each other, while minimizing the computational load necessary to obtain the shared secret key.

The system and method of the exemplary illustrative non-limiting technology herein can be implemented in a local area network, wide area network, public access network (e.g., Internet), in a network of networks such as a hybrid network, or in other communication environments as would be apparent. In a network implementation that conforms to the OSI model, the shared secret key may be viewed as a session key. In an OSI-compliant exemplary illustrative non-limiting embodiment, the protocol for obtaining a shared secret key resides at layers 5 and/or 6 of the OSI model, and supports secret key based encoded transport of any developer-defined or selected client-server or peer-to-peer protocol. In addition, a user authentication graphical user interface (GUI) for any developer-defined applications may be provided above the exemplary illustrative non-limiting protocol, as would be apparent. In addition, the exemplary illustrative non-limiting protocol may be encapsulated within another protocol such as a firewall, a virtual private network, or both, or any other protocol as would be apparent. With encapsulation, an application benefiting from the authentication and encoded transport of the exemplary illustrative non-limiting implementation does not need to be aware of the details or even the existence of the underlying protocol.

In generating a shared secret key according to some exemplary illustrative non-limiting embodiments, the system and method provides a secure and robust user authentication protocol, based on asymmetric key encoding. In an exemplary illustrative non-limiting embodiment, a first party communicates a public key to a second party using information obtained from a password associated with a user of the second party. The first and second parties exchange shared secret keys which no outside observer can obtain without information about the password and information about a private key associated with the public key, which is not communicated.

Figure 1B:
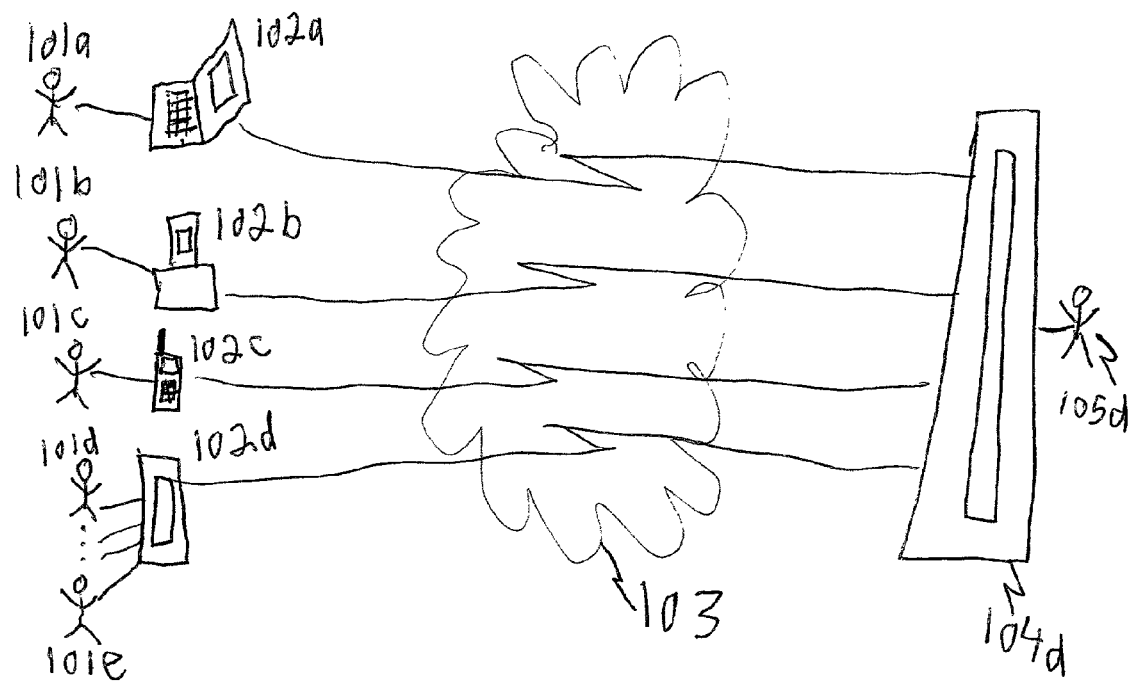
FIG. 1b illustrates an exemplary illustrative non-limiting client-server embodiment, including various embodiments of a client.

FIG. 1a and FIG. 1b depict exemplary illustrative non-limiting embodiments of the environment. FIG. 1a shows an exemplary peer-to-peer embodiment. Users 101a through 101e and 105a through 105e are graphically depicted as human users for ease of representation, although they may be automated entities such as applications, deamons, or other electronically-driven users. A user need not be associated with a particular human if it is a non-human user such as a software-driven user, although it can be. Calling users 101 communicate with (i.e., are connected to) exemplary calling platforms 102a through 102d, and called users 105 communicate with exemplary called platforms 104a through 104d.

The term 'party' may refer to a user, a platform, or both a user and a platform with which the user is associated. In one exemplary illustrative non-limiting embodiment, a calling party is a party that initiates a communications session; and a called party is a party that responds to a calling party's initiation of a communications session. Network 103 represents any network or network of networks, such as the Internet, and may include firewalls, virtual private networks, and any kinds of connections (e.g., wireless, Ethernet, etc.), routers, gateways, protocols, and other components as would be apparent. Exemplary platforms 102a and 104a represent laptop computers, which may be connected to network 103 via wire-line or wireless connections, as would be apparent. Exemplary platforms 102b and 104b represent workstations or personal computers. Exemplary platforms 102c and 104c represent handheld devices. Exemplary platforms 102d and 104d represent servers, which may be better equipped than the other exemplary platforms to handle simultaneous connections to multiple users including remote users, as illustrated. Other platforms may be used, such as a dumb terminal, as would be apparent. For the purposes of this specification, a platform may comprise one or more pieces of hardware, a process running on the hardware, a process in memory or storage, or a combination thereof. For example, platform 104d may represent the physical server, i.e., the hardware comprising the server. Alternatively, platform 104d may represent a server process running on the server or in memory on the server. As an additional alternative, platform 104d may represent a combination of these things. A non-human user may be running at least partially on a platform with which it is associated, or it may be running completely remotely. The meaning of platform varies throughout the specification, and is in each case subject to any of the interpretations just enumerated.

FIG. 1a depicts a peer-to-peer configuration, in which a party (possibly including one of exemplary users 101a through 101e and/or one of corresponding exemplary platforms 102a through 102d) may be either a calling party or a called party. Similarly, any of exemplary users 105a through 105e and/or a corresponding exemplary platform 104a through 104d, could be either a calling or a called party. FIG. 1b represents a client-server configuration in which a client (possibly including one of exemplary users 101a through 101e and/or one of corresponding exemplary platforms 102a through 102d) is the calling party and a party on the server side, including user 105d and/or server platform 104d is the called party 105d. The exemplary illustrative non-limiting technology herein may be used to connect parties, including a calling party and a called party to provide for authentication and/or secure communication between the calling party and the called party, through network 103.

A random number has the property that it is difficult for a would-be attacker to determine the random number without obtaining information characterizing the random number. A random number that is either communicated or intended to be communicated between a calling party and a called party is referred to as a shared random number. In order to communicate a shared random number, a party may send or receive the shared random number or information from which the shared random number may be obtained without additional information specific to the shared random number and without an astronomical number of computations. A shared random number may be sent or received by transmitting or receiving over a communications channel or a network information from which the shared random number may be easily inferred, such as the shared random number itself.

The exemplary illustrative non-limiting technology herein employs at least two shared random numbers to obtain a shared secret key. The shared random numbers are passed through a combining function to obtain information used to determine the shared secret key. A combining function may be any function, including a compound function, i.e., a function of functions, that has a first input including a first number and a second input including a second number. Additionally, a combining function has the property that knowledge of a single input to the combining function does not substantially reduce the difficulty of determining an output of the combining function. It is preferred that a combining function be used such that knowledge of a single input to the combining function does not reduce the difficultly of determining an output of the combining function at all.

A benefit of passing shared random numbers through a combining function to obtain a shared secret key is that a would-be attacker will be unable to compromise the shared secret key by obtaining only one random number, either through observation or manipulation of a party or its communications, even with knowledge of the protocols used and the combining function itself. A combining function may involve one or more of a number of operations on its inputs and any parameters that might be inherent to the combining function. For example, addition, subtraction, multiplication, division, exponentiation, logarithms, trigonometric functions, and/or modulo operations could be used. A combining function could include a logical function, such as OR, AND, NOR, NAND, XOR, and/or XNOR, blending or merging (scaling, and then addition), bit shifting, concatenation, truncation, or any combinations thereof. Additional operations, conditional operations, and various combinations of operations, in serial and/or parallel may be used, as would be apparent. In an exemplary illustrative non-limiting embodiment, an XOR operation is used, which would permit the use of a combining function as simple as specifying an output of a combining function to be equal to an XOR of two inputs.

Figure 2:
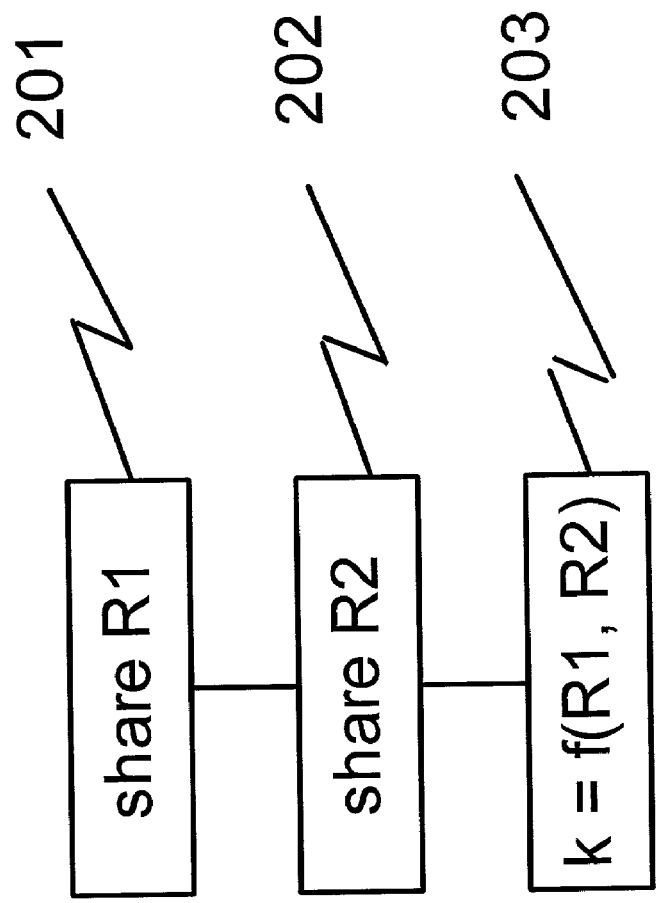
FIG. 2 illustrates a sequence of exemplary illustrative non-limiting operations performed by a peer, a client, or a server.
Figure 3:
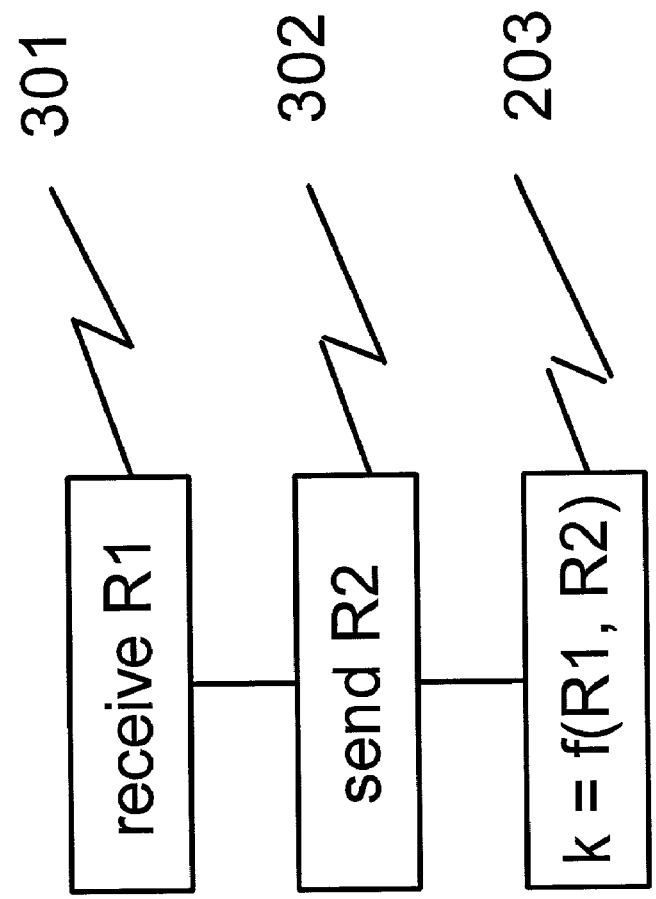
FIG. 3 illustrates an exemplary illustrative non-limiting sequence of operations performed by a calling party in a peer-to-peer embodiment, or a client in a client-server embodiment.
Figure 4:
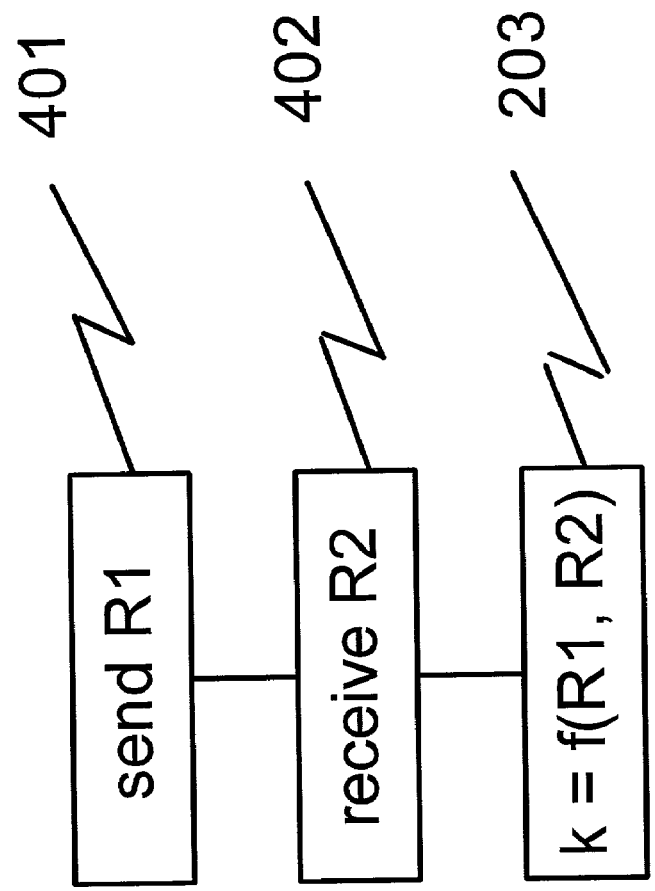
FIG. 4 illustrates a sequence of exemplary illustrative non-limiting operations performed by a called party in a peer-to-peer embodiment, or a server in a client-server embodiment.

FIG. 2 illustrates a set of steps performed by a party in an exemplary illustrative non-limiting embodiment. In step 201, the party shares a first random number R1. The random number could be shared by being communicated to or from another party, possibly through intermediaries. In step 202, the party shares a second random number R2. In step 203, the party obtains an output K of a combining function f( ) with a first input including R1 and a second input including R2. In FIGS. 2-4, for ease of presentation, an exemplary illustrative non-limiting embodiment of the combining function is shown with two inputs consisting of R1 and R2, respectively, yielding K=f(R1,R2).

FIG. 3 illustrates a set of steps performed by a calling party in an exemplary illustrative non-limiting embodiment. In an exemplary illustrative non-limiting client-server embodiment, FIG. 3 illustrates a set of steps performed by a client. For ease of description, the party executing the steps in FIG. 3 will be referred to as a 'calling party,' which encompasses the term 'client.' In step 301, the calling party receives a first shared random number R1. In step 302, the calling party sends a second shared random number R2. In step 203, the calling party obtains an output K of a combining function f( ) with a first input including R1 and a second input including R2.

FIG. 4 illustrates a set of steps performed by a called party in an exemplary non-limiting embodiment. In an exemplary client-server embodiment, FIG. 4 illustrates a set of steps performed by a server. For ease of description, the party executing the steps in FIG. 4 will be referred to as a 'called party,' which encompasses the term 'server.' In step 401, the called party sends a first shared random number R1. In step 402, the called party sends a second shared random number R2. In step 203, the called party obtains an output K of a combining function f( ) with a first input including R1 and a second input including R2.

Figure 5:
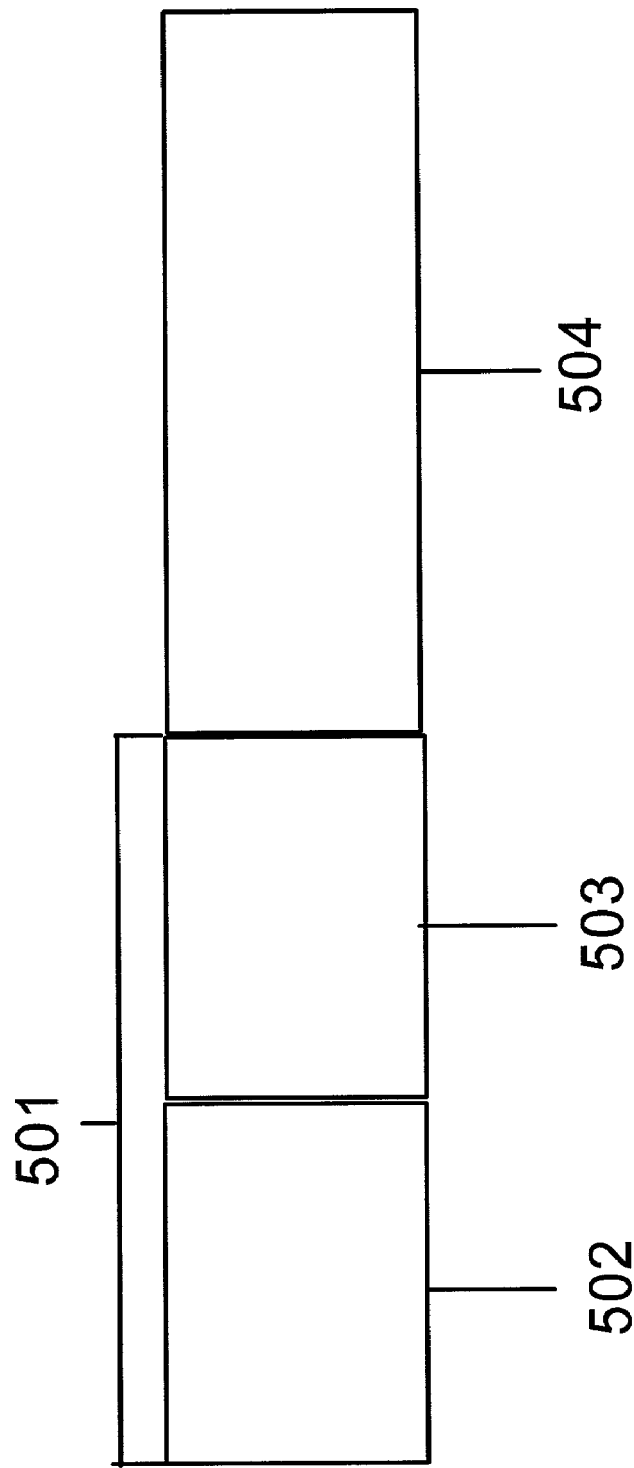
FIG. 5 illustrates a packet that may be used in an exemplary illustrative non-limiting signal embodiment.

When a party communicates information, it may do so over network 103. In order to send information, the information may be encoded to comply with a communications protocol. It may further be encoded with keys, passwords, or information derived therefrom. Encoding with keys or passwords or information derived therefrom may comprise encryption, or other forms of transforming data as would be apparent. If information is sent through network 103, it may be encoded in packets, such as IP packets. An exemplary IP packet is illustrated in FIG. 5. The IP packet of FIG. 5 includes an IP header 501 including a source address 502 and a destination address 503, and embedded data 504 including part of the information sent through the network. When a party receives information through network 103, it may decode information according to a network protocol, such as the Internet Protocol. Information may be decoded with keys or passwords or information derived therefrom. Decoding with keys or passwords or information derived therefrom may comprise decryption. Decoding of information may also comprises parsing, in which information is extracted from data passed through a network, such as a packet or packets.

Information communicated over network 103 is propagated through network 103 between communicating parties. Networks may comprise many kinds of links, including wireless links. Signals sent over the network may be embedded in a carrier wave, and may be propagated, e.g., as an analog or a digital signal.

If keys or passwords, including information derived from them are used to encode or decode information, then a key or password may itself be encoded. In one exemplary illustrative non-limiting embodiment, a password is encoded to obtain a 128-bit key. One method of performing this encoding is as follows. In a first step, lease.oval-hollow. is used to transform all alphabetic characters to lower-case. In a second step, characters are transformed based on a stored table. In a third step, all bits in the transformed representation of each character are concatenated. In a fourth step, the resulting bit stream is repeated until the total bit length is 128. In a fifth step, IDEA is used to encrypt the original password using the 128-bit stream as the secret key. In a sixth step, the cyphertext is padded to create a 128-bit key, which may be used to encode and/or decode information.

The above method for encoding a password is an example of using a one-way function. A one-way function has the property that it is computationally infeasible to determine an input to the function by using an output of the function. The six-step method for encoding the password is equivalent to passing the password through a function. In this case, it is a one-way function because the encrypting step makes it computationally infeasible to recover the input by using the output. Another example of a one-way function is a hash.

FIG. 6 illustrates an exemplary illustrative non-limiting embodiment. The four columns of the figure represent users and platforms. Specifically, column 101 represents a calling party, column 102 represents a calling platform, column 104 represents a called platform, and column 105 represents a called user. Calling user 101 is connected to calling platform 102, and called user 105 is connected to called platform 104. Arrows represent messages sent between the four entities (columns) in FIG. 6, and numbers without arrows represent operations that may be performed by either or both of the adjacent columns. For example, step 601 represents a message sent from calling user 101 to calling platform 102, and step 604 represents a step that may be performed by called platform 104, called user 105, or both.

In step 601, calling user 101 sends user identification information (User ID) and a password to calling platform 102. The password does not need to be placed in storage on calling platform 102, and could be held in memory on platform 102 just long enough for it to fulfill its use. If calling user 101 is a human user, the action of sending the User ID and password to platform 102 could be triggered by the action of the human user typing in the User ID and password on a keyboard or other alphanumeric input device. In step 602, calling platform 102 sends information to called platform 104 including information obtained from the User ID and information concerning a protocol and version that calling platform 102 is capable of using.

Step 603 is carried out by the calling party, which may comprise calling user 101, calling platform 102, or both. In step 603, a first key, denoted $K_{user}$, is generated using information obtained from the password. In some exemplary illustrative non-limiting embodiments, the first key is generated as an output of a one way function having an input including the password. In other embodiments, other methods of encoding the password may be used to obtain $K_{user}$. Other methods may be used to obtain $K_{user}$, as would be apparent.

Steps 604 through 606 are carried out by the called party, which may comprise called platform 104, called user 105, or both. In step 604, the called party identifies a first shared random number R1. This and other identification steps could comprise, for example, generating R1, looking up R1 in a table, obtaining R1 from an external source, and/or other methods as would be apparent. In step 605, the called party identifies an asymmetric key pair comprising two corresponding asymmetric keys, e.g., a public key and a private key. For ease of representation, the two asymmetric keys are denoted $K_{public}$ and $K_{private}$.

In step 606, a first key, $K_{user}$, is obtained by using information obtained from the User ID. In some client-server embodiments, the first key is obtained by performing a table lookup using information obtained from the User ID. For example, one embodiment that uses a first key comprising an encoded password requires the called party to have access to a table of passwords, which are indexed by User ID. In this way, step 606 may be performed by looking up the password in the password table using the User ID or information obtained therefrom, and sending the password through a one-way function to obtain the first key. Alternatively, the password table may contain encrypted or encoded passwords, and a simple table lookup may be used to obtain the first key without an extra encoding step. In another embodiment, the password table is itself encoded. The table could be encoded as a whole, or it could be broken into sub-tables or fields, with each sub-table or field encoded separately. If the password table is encoded, the called party may decode the table or a relevant part of it as part of step 606.

Step 606 may be performed in other ways. For example, in some embodiments including a peer-to-peer embodiment, information obtained from the User ID is used to obtain from a trusted third party either the first key or information used to generate the first key.

In step 607, the called party sends the calling party a first message encoded with the first key, $K_{user}$. The first message includes the first shared random number, R1, and one of the two asymmetric keys identified in step 605, which we arbitrarily denote $K_{public}$. The first message also includes a timestamp in some embodiments, although in a preferred embodiment timestamps are not used because of timing synchronization issues. The first message may be denoted $K_{user}$ (R1,$K_{public}$,timestamp).

Steps 608 and 609 are performed by the calling party, comprising the calling user 101 and/or the calling platform 102. In step 608, the first message is decoded. In order to decode the first message, the calling party uses $K_{user}$. Then, R1 and $K_{public}$ are obtained from the first message. One method to obtain R1 and $K_{public}$ from the first message is to parse the message, including any header information that may exist. If the first message includes a timestamp, then it may be obtained from the first message and compared to the actual time. In step 609, a second shared random number R2 is identified.

In step 610, the calling party sends the called party a second message encoded with the asymmetric key $K_{public}$. The second message contains the second shared random number R2. The second message also includes a timestamp in some embodiments, although in a preferred embodiment timestamps are not used because of time synchronization issues. The second message may be denoted $K_{public}$ (R2, timestamp).

Step 611 is carried out by the called party. In step 611, the second message is decoded using the other asymmetric key, $K_{private}$, to obtain R2. One method to obtain R2 from the second message is to parse the message, including any header information that may exist. If the second message includes a timestamp, then it may be obtained from the second message and compared to the actual time.

Step 612 is carried out both by the calling party and by the called party. In step 612, the shared secret key, $K_{ss}$, is obtained from an output of a combining function having a first input including the first shared random number and a second input including the second shared random number. In one embodiment, the shared secret key is the output of a combining function having two inputs consisting of the two shared random numbers. This is denoted by $K_{ss}$=f(R1,R2).

In step 613, the two parties communicate using $K_{ss}$. $K_{ss}$ may be used, e.g., in any symmetric encryption system to transform messages. A sender of a message transforms the message by encoding it using $K_{ss}$, and a receiver of a message transforms the message by decoding it using $K_{ss}$.

The exemplary illustrative non-limiting technology herein may be used with client/server and peer-to-peer embodiments. In a peer-to-peer architecture, the called party could also pre-generate keys. A problem with peer-to-peer is that password management becomes difficult because there is no centralized repository. Because password information is extremely sensitive, passing passwords becomes a challenge.

Use of exemplary illustrative non-limiting implementations herein accrues numerous benefits. One benefit is that there is no need to use certificates. Therefore, there is no need to register with Certificate Authorities and keep them up to date. This removes an external source of unnecessary problems—a Certificate Authority's errors. Furthermore, if a user wishes to log in to a server using a client-server embodiment, then any computer logged in to (i.e., used as a client) can immediately have access without ensuring that the computer has been registered with a certificate authority.

Another benefit of the exemplary illustrative non-limiting technology herein is that in some embodiments keys are not stored on local computers. In embodiments in which keys are generated dynamically, keys never need to be stored on a filesystem. Storing keys on the system allows someone who is capable of compromising a computer to steal the keys, and decrypt messages past, present, or future. In some exemplary illustrative non-limiting embodiments, keys are constantly changed and never stored on a computer's hard drive.

Yet another benefit of the exemplary illustrative non-limiting implementations is that it is not necessary for a calling party to generate keys. Generating asymmetric key pairs can be computationally expensive, resulting in system delays. A calling party may have access only to limited computational resources. If an asymmetric key pair is generated on a limited machine, connection times between 15 seconds and nearly 2 minutes are typical using current hardware and algorithms. As keys take more computing power to generate, which is likely because the requirements of key size will increase, the exemplary illustrative non-limiting implementation will allow a quick logon time from a computationally limited calling party. In some client-server embodiments, a server may generate keys constantly (i.e., semi-dynamically). Semi-dynamic key generation in a client-server embodiment allows connection latency to be independent of client and server hardware requirements.

Still another benefit of the exemplary illustrative non-limiting technology herein is that human users don't need to bring anything with them when connecting to another party in a peer-to-peer embodiment or logging on in a client-server embodiment. All that a human user needs to supply is a password. There is no need for a human user to carry a floppy disk with his or her stored "authorized key pair," which reduces the potential for human error, e.g., an administrator emailing a key pair to a human user. Also, there is no need for a human user to have a physical token to log on. This enables true mobility by preventing the need for hardware such as a SmartCard reader.

A security benefit of the exemplary illustrative non-limiting technology herein comes from the double integrity of the shared secret key. In an exemplary illustrative non-limiting implementation, the shared secret key is not sent in a single message. The shared secret key is computed based on the values of two shared random numbers. The first shared random number is encoded using a function based on the password. The second shared random number is encoded using a random public key. So even if someone were able to somehow steal a user's password, he still would have no way to decrypt the messages that the user had transmitted in the past. Secure data remains secure.

The double integrity of the shared secret key adds another benefit: if an attacker is able to penetrate a party and manipulate it prior to or during a communications session, it might in this way be able to weaken, sabotage, specify, or intercept a shared random number. However, without the other shared random number, the attack would not yield the shared secret key. No attack that targets only one shared random number can weaken the shared secret key.

The exemplary illustrative non-limiting technology herein provides strong security protection in obtaining a shared secret key. The following are some exemplary illustrative non-limiting examples of attacks that are thwarted by the technology herein:

No password eavesdropping
  No form of the password is ever sent, so one could never obtain the password.
No password database hijacking
  The password database itself is encrypted, so one would never be able to grab any form of the password, to launch an off-line password guessing attack.
No reflection (man-in-the-middle) attack
  At no point can a message be pulled from one authentication session, and used sensibly in a different session, to obtain access to keys or messages.
No replay attack
  Because of the use of timestamps in some exemplary illustrative non-limiting embodiments, it is not possible to use untampered messages to cause either party to undergo processing that would ordinarily prohibit a valid user from gaining access to the system.
No impersonating called party
  Impersonating the server would never gain an impersonator access to a password, because no form of the password is ever sent by the calling party. (The called party uses a function of the password as a key.) For this matter, it would never make sense for an attacker to impersonate the called party.

The specific algorithms and steps described herein, as well as the basic steps which such algorithms represent (even if they are replaced by different algorithms), are designed for implementation using general purpose microprocessors. Furthermore, each of the algorithms and steps described herein, as well as the basic steps represented by such algorithms, can be encoded on computer storage media such as CD ROMS, floppy disks, computer hard drives, and other magnetic, optical, other machine readable media, whether alone or in combination with one or more of the algorithms and steps described herein.

Although the methods discussed herein have been described in detail with regard to some exemplary embodiments and drawings thereof, it should be apparent to those skilled in the art that various adaptations and modifications of the methods can be accomplished. Thus, by way of example and not of limitation, the methods are discussed as illustrated by the figures. Accordingly, the invention is not limited to the precise embodiments shown in the drawings and described in detail hereinabove, but is set out in the following claims.

What is claimed is:

1. A method for establishing a secure communications session between a first computing device and a second computing device, the method comprising:
    retrieving a first random number at the first computing device;
    retrieving a second random number at the second computing device;
    retrieving at least one public-private key pair including a public key and a private key;
    sending a message from said second computing device to said first computing device, said message from said second computing device to said first computing device including said first random number and the public key of said at least one public-private key pair to thereby share at least said first random number with said first communication device, said message from said second computing device to said first computing device being encrypted with an encoded password;
    providing said encoded password to said first computing device;
    using said provided encoded password to decrypt said first message at said first computing device to obtain at least said first random number that said second computing device sent in said message from said second computing device to said first computing device;
    sending a message from said first computing device to said second computing device, said message from said first computing device to said second computing device including said second random number, said first computing device encrypting said message it sends to said second computing device;
    generating, at each of said first and second computing devices, a shared session key by combining said first random number and second random number that is now available to each of said first and second computing devices through said above-mentioned message exchanges; and
    using said shared session key to establish a secure private communication session between said first and second computing devices.

2. The method of claim 1, wherein said combining includes a logical function.

3. The method of claim 2, wherein said logical function includes an exclusive or (XOR) function.

4. The method of claim 1 wherein said password comprises a user password.

5. The method of claim 1 wherein said encoded password comprises a user password encoded with a hash function.

6. The method of claim 1 further including generating said first and second random numbers on demand.

7. The method of claim 1 further including generating said public-private key pair on demand.

8. The method of claim 1 wherein said second computing device comprises a server, and said first computing device comprises a client wishing to communicate with said server.

9. The method of claim 1 wherein said first computing device uses said public key obtained from said message send from said second computing device to said first computing device to encrypt said message from said first computing device to said second computing device.

10. The method of claim 1 further including prompting a user to input a password into said first computing device, and encoding said inputted password at said first computing device to provide said encoded password.

11. A method for establishing secure communication between a calling party and a called party, comprising:
    generating, on demand at the called party, an asymmetric key pair including a public key and a private key;
    transmitting, from said called party to said calling party, a first encrypted message including a first random number and said public key of said asymmetric key pair, said called party encrypting said first message with an encoded password known to both the calling party and the called party;
    said calling party receiving and decrypting said first encrypted message using said encoded password to obtain said first random number and said public key;
    said calling party transmitting, to said called party, a second encrypted message including a second random number, said calling party encrypting said second message with said public key of said asymmetric key pair;

said called party receiving and decrypting said second encrypted message to obtain said second random number;

said calling and called parties each independently applying said now-shared first and second random numbers to combining functions to thereby each independently generate a shared secret key; and said calling and called parties encrypting further communications therebetween at least in part using said shared secret key.

12. The method of claim 11 wherein said symmetric encryption key comprises a password.

13. The method of claim 11 wherein said called party comprises a server and said calling party comprises a client that wishes to communicate with said server.

14. The method of claim 11 further including said called party retrieving said password or encoded password from a user database in response to receipt of a request by said calling party for a secure communication.

15. The method of claim 11 wherein said generating comprises generating said asymmetric key pair at said called party.

16. The method of claim 11 wherein said encrypted communication proceeds between said calling party and said called party without requiring said calling party to generate an asymmetric key pair.

* * * * *